ced June 18, 1957

2,796,446

DIALKYL NITROPHENOL PRODUCT AND METHOD

Richard T. Dickerson, Jr., and William K. Schweitzer, Jr., Midland, Mich., assignors to The Dow Chemical Company, Midland, Mich., a corporation of Delaware No Drawing. Application March 5, 1956, Serial No. 569,263

2 Claims. (Cl. 260—622)

This invention is directed to a novel dialkyl nitrophenol and to a method for its preparation.

The new compound, 6-nitro-2,4-ditertiarybutylphenol, is a yellow crystalline solid, readily soluble in many organic solvents and having relatively low solubility in water. It has been found useful as a parasiticide suitable for the control of insects such as aphids on nasturtiums and of fungus diseases of plants such as early blight on tomatoes. The new compound has further been found to have a surprising selective herbicidal effect when applied to soil for the control of germinant seed and emerging seedlings of gramineous species.

6-nitro-2,4-ditertiarybutylphenol is prepared by reacting 2,4-ditertiarybutylphenol with a molar excess of fuming nitric acid at temperatures below 0° C. in the presence of a reaction solvent. Good yields have been obtained by employing a mixture of glacial acetic acid and acetic anhydride as reaction solvent. On completion of the reaction, the desired nitrophenol product is separated by extraction, salt formation and recrystallization as will be hereinafter set forth.

In carrying out the reaction, the 2,4-ditertiarybutylphenol is dissolved in an excess of a mixture of glacial acetic acid and acetic anhydride and the resulting mixture cooled and added portionwise with stirring to a solution of a molar excess of 90 percent fuming nitric acid in glacial acetic acid. The reaction mixture is maintained at temperatures below 0° C. and preferably at from about −10° to −15° C. with stirring for a period of time to complete the reaction. The reaction proceeds readily when the di-tertiarybutylphenol and nitric acid are contacted under the above conditions and the rate of reaction may be controlled by the rate of admixture of the reactant solutions. As soon as the admixture of the reactants is completed, the reaction mixture is poured into an excess of crushed ice and from the resulting mixture the nitrophenol product is extracted with a liquid hydrocarbon such as hexane. Thereafter, the extract is separated, washed with water and dilute aqueous sodium bicarbonate solution and the contained 6-nitro-2,4-ditertiarybutylphenol separated by precipitation as the sodium salt, conversion of the latter to the free phenol and crystallization.

In a representative operation, 50 grams (0.25 mole) of 2,4-ditertiarybutylphenol was dissolved in a mixture of 45 grams (0.75 mole) of glacial acetic acid and 100 grams (1 mole) of acetic anhydride. The resulting solution was cooled and added portionwise to a solution of 25.5 grams (0.375 mole) of 90 percent fuming nitric acid in 75 grams (1.25 moles) of glacial acetic acid maintained at a temperature of −10° to −15° C. As soon as the addition was complete, the crude reaction product was poured into an excess of crushed ice. The resulting mixture was extracted with normal hexane and the hexane extract separated, washed with water and with an aqueous 1 percent by weight sodium bicarbonate solution. The washed hexane extract was mixed with an excess of aqueous 10 percent sodium hydroxide solution to precipitate the sodium salt of 6-nitro-2,4-ditertiarybutylphenol and the latter was separated by filtration. Thereafter, the sodium salt was dissolved in a minimum quantity of glacial acetic acid and the resulting solution diluted with water to precipitate the desired 6-nitro-2,4-ditertiarybutylphenol. The latter was separated by filtration and recrystallized from 95 percent ethyl alcohol to obtain the desired 6-nitro-2,4-ditertiarybutylphenol product as a yellow crystalline solid melting at 62.5°–63° C.

The 6-nitro-2,4-ditertiarybutylphenol product was dissolved in xylene together with a non-ionic emulsifying agent to prepare the following composition.

| Ingredient: | Parts by weight |
|---|---|
| Nitrophenol product | 25 |
| Xylene | 65 |
| Alkylphenol-polyoxyethylene condensation product | 10 |

This composition was dispersed in water to prepare an aqueous emulsion and the latter was applied as a soil drench to areas of soil infested with seed of wild oats and Japanese millet and planted to radishes. The dosage of the nitrophenol product was adjusted to supply this material at the rate of 12.5 pounds per acre. The above treatment resulted in 100 percent control of the growth of the wild oats and millet, while radishes, planted in the same area, emerged and made vigorous growth.

We claim:
1. 6-nitro-2,4-ditertiarybutylphenol.
2. A method for the preparation of 6-nitro-2,4-ditertiarybutylphenol which comprises the step of contacting 2,4-ditertiarybutylphenol with a molar excess of fuming nitric acid at a temperature below 0° C. and in the presence of a mixture of glacial acetic acid and acetic anhydride as a reaction solvent.

References Cited in the file of this patent

Ipatieff et al.: Jour. Amer. Chem. Soc., vol. 60 (1938), pp. 2495–97 (3 pp.).